United States Patent [19]
Arold et al.

[11] Patent Number: 5,340,022
[45] Date of Patent: Aug. 23, 1994

[54] ASSEMBLY ARRANGEMENT FOR A VEHICLE HEATING SYSTEM OR AIR CONDITIONING SYSTEM

[75] Inventors: Klaus Arold; Otto Player, both of Sindelfingen, Fed. Rep. of Germany

[73] Assignee: Mercedes-Benz AG, Fed. Rep. of Germany

[21] Appl. No.: 992,109

[22] Filed: Dec. 17, 1992

[30] Foreign Application Priority Data

Dec. 18, 1991 [DE] Fed. Rep. of Germany ....... 4141834

[51] Int. Cl.$^5$ ............................................. B60H 1/02
[52] U.S. Cl. ................. 237/12.3 A; 29/418
[58] Field of Search ............ 237/12.3 A, 12.3 B, 237/12.3 C, 2 A; 165/42, 76, 80.1; 62/244, 298; 29/418, 423

[56] References Cited

U.S. PATENT DOCUMENTS

| | | | |
|---|---|---|---|
| 4,252,271 | 2/1981 | Green | 237/12.3 A |
| 4,420,115 | 12/1983 | Matsushima et al. | 237/12.3 A |
| 4,892,984 | 1/1990 | Clark et al. | |

FOREIGN PATENT DOCUMENTS

| | | |
|---|---|---|
| 3936776 | 5/1991 | Fed. Rep. of Germany . |
| 2534859 | 10/1983 | France . |
| 2654042 | 11/1990 | France . |
| 946434 | 1/1964 | United Kingdom . |

*Primary Examiner*—Henry A. Bennett
*Attorney, Agent, or Firm*—Evenson, McKeown, Edwards & Lenahan

[57] ABSTRACT

The invention concerns a heating system or air conditioning system for vehicles having a heater box and an operator unit which has to be arranged separately from the heater box in the passenger compartment. In order to hold the operator unit on the heater box until the point of final assembly and for the purpose of adjusting the operator unit during preassembly, a two-part assembly aid element is provided, of which one part is firmly connected to the heater box and the other part is firmly connected to the operator unit so that the operator unit is fixed so that it cannot be varied until final assembly on the heater box. In order to configure the assembly aid element so that it can be manufactured simply and at low cost, its two parts are formed by two plug-in parts of a plug-in connection which can be pushed one into the other and a clip-type interlock is included in the plug-in connection. The interlock engages automatically due to axial pressure on the plug-in parts and is released by axial tension on one of the plug-in parts.

16 Claims, 3 Drawing Sheets

ASSEMBLY ARRANGEMENT FOR A VEHICLE HEATING SYSTEM OR AIR CONDITIONING SYSTEM

BACKGROUND AND SUMMARY OF THE INVENTION

The invention concerns a heating system or air conditioning system for vehicles. More specifically, the invention relates to heating systems or air conditioning systems of the type having an air box such as a heater box and an operator unit for at least one control unit such as an air distribution flap, which operator unit has to be arranged separately from the air box in the passenger compartment such as at an instrument panel, the operator unit being connected to the air box by means of a control line leading to the control unit, and having a two-part assembly aid element of which one part is firmly connected to the air box and the other part is firmly connected to the operator unit, the two parts being put together in the pre-assembly condition to hold the operator unit on the air box and being pulled apart after installation of the air box for the purpose of placing the operator unit at the installation location.

In such heating systems or air conditioning systems, manual operator actions are undertaken at the operator unit and these operator actions are transmitted via the control line to the at least one control unit integrated in the air box and there lead to corresponding adjustment or switching procedures.

An example of such an adjustment procedure is the adjustment of air distribution flaps in the heater box, as is described in German Patent Document DE 39 36 776 C1. In this case, the operator unit is accommodated in an operator surface, for example the dashboard or the instrument panel of the motor vehicle, and is connected via a universal joint arrangement to at least one pivoting lever for the air distribution flaps. The pivoting lever is pivotably supported on the heater box. The pivoting lever and air distribution flaps form the at least one control unit previously mentioned and, in this case, the control unit controls the air distribution corresponding to the adjustment undertaken at the operator unit. The manually initiated rotary motions of a rotary knob on the operator unit are transmitted via the universal joint arrangement to the pivoting lever and lead to the desired adjustment of the air distribution flaps. In order to compensate for tolerances in the path of motion, the link rod of the universal joint arrangement is of telescopic configuration and its two telescopic parts are guided so that they cannot be rotated relative to one another but can be axially displaced relative to one another.

Such heating systems and air conditioning systems are supplied as adjusted installation units for installation in the motor vehicle so that adjustment work becomes unnecessary during assembly. In order to hold the adjusted operator unit on the heater box until final assembly, the heater box and the operator unit are firmly connected to each other after adjustment by means of the two-part assembly aid element. In a known heating system or air conditioning system, the assembly aid element is embodied as a U-shaped retention shackle which is fastened to two holders attached to the heater box, to be precise to the side facing the operator unit. The transverse web of the holder carries the operator unit and the two arms of the shackle connected to each other by means of the transverse web are engaged in each of the two holders. During assembly, the heater box is first installed in the vehicle so that the operator unit comes to rest at a small distance in front of its final installation location. After the assembly of the operator surface, for example the dashboard or the instrument panel, the retention shackle together with the operator unit is pulled onto the back of the operator surface and is fastened to the latter. During this procedure, the arms of the U-shaped retention shackle are withdrawn from the two holders and the operator unit is disconnected from the heater box. Because of the inaccessibility of the installation space between the side of the heater box facing towards the operator unit and the back of the operator surface, the holder and retention shackle are not removed and remain at the installation location.

An object of the invention is to improve the assembly aid for connecting the operator unit and the heater box in the pre-assembly condition in a heater system or air conditioning system of the type mentioned above in such a way that simple and low cost manufacture is achieved.

The object is achieved in a heating system or air conditioning system of the generic type mentioned above by providing an arrangement wherein the two parts of the assembly aid element are formed by two plug-in parts of a plug-in connection which can be plugged one into the other and wherein a clip-type interlock is attached to the plug-in connection, which clip-type interlock which is engaged by axial pressure on the plug-in parts and can be released by axial tension on one of the plug-in parts.

The heating system or air conditioning system according to the invention has the advantage that only one single part remains necessary for the assembly aid element on the heater box and this part can, if need be, be removed as desired from the heater box after the completion of assembly. In addition, this part can be manufactured as a low-price plastic part. The connection and disconnection of the operator unit and the heater box can be carried out rapidly by simply plugging in and pulling apart, respectively. An interlock prevents unintentional separation of the plug-in connection before final assembly.

Advantageous embodiments of the heating system or air conditioning system according to the invention with desirable further developments and embodiments of the invention are given in the further claims.

In a preferred embodiment of the invention, one plug-in part is designed as a plug-in sleeve and the other as a plug-in peg which can be pushed into it. The interlock consists of an engagement hole in one plug-in part and a spring engagement tongue with an engagement lug protruding from it on the other plug-in part. The engagement lug is provided with two lift-out bevels diametrically opposite to one another in the plug-in direction of the plug-in parts. On the one hand, these bevels permit the engagement lug to be pushed onto one plug-in part and, on the other, they permit the engagement lug to be lifted out of the engagement hole of this plug-in part.

In a preferred embodiment of the invention, the plug-in sleeve is configured on the back of the operator unit, preferably integrally with its casing, and the plug-in peg is configured on the free end of a connecting arm, preferably integrally with the latter, the arm being releasably fastened to a position on the heater box which is accessible after the final assembly of the heater box in the vehicle. This design embodiment has the advantage that the arm carrying the plug-in peg, which is the more voluminous and—in terms of manufacturing costs—the more expensive part of the assembly aid element, can be removed after the installation of the heating system or air conditioning system in the motor vehicle and, if need be, can be used again in the pre-assembly of further heating systems or air conditioning systems. The dimensions of the plug-in sleeve which cannot be released and remains on the operating unit can be kept so small that the continued presence of the sleeve does not hinder other installation measures.

In accordance with a further embodiment of the invention, the spring engagement tongue of the interlock is arranged on the plug-in peg, being fixed by the base of the tongue on the plug-in peg and extending towards the free end of the plug-in peg parallel to and at a distance from the latter which is slightly larger than the wall thickness of the plug-in sleeve. The engagement lug projects from the engagement tongue towards the plug-in peg and the engagement hole is embodied as a drilled hole in the plug-in sleeve. This design measure also contributes to the fact that the plug-in sleeve, which remains on the operator unit after final assembly, is kept very simple from the manufacturing point of view and that all the more expensive manufacturing measures occur on the plug-in peg. Because the arm carrying the plug-in peg is removed and can be reused after final assembly of the heating system or air conditioning system, it is only necessary to hold a limited stock of the more expensive part of the assembly aid element. This further reduces the manufacturing costs.

In order to avoid loss of adjustment of the heating system or air conditioning system after preassembly, a rotational lock is provided, in accordance with a further embodiment of the invention, to prevent relative rotation between the two plug-in parts. The rotational lock can be realized for example by an axial groove machined into one plug-in part and an axial rib on the other plug-in part which can be pushed as a form fit into the axial groove. Rotational locking is, however, also achieved by the fact that the plug-in sleeve and the plug-in peg are embodied with rectangular cross-section.

Other objects, advantages and novel features of the present invention will become apparent from the following detailed description of the invention when considered in conjunction with the accompanying drawings.

DETAILED DESCRIPTION OF THE DRAWINGS

Figure 1:
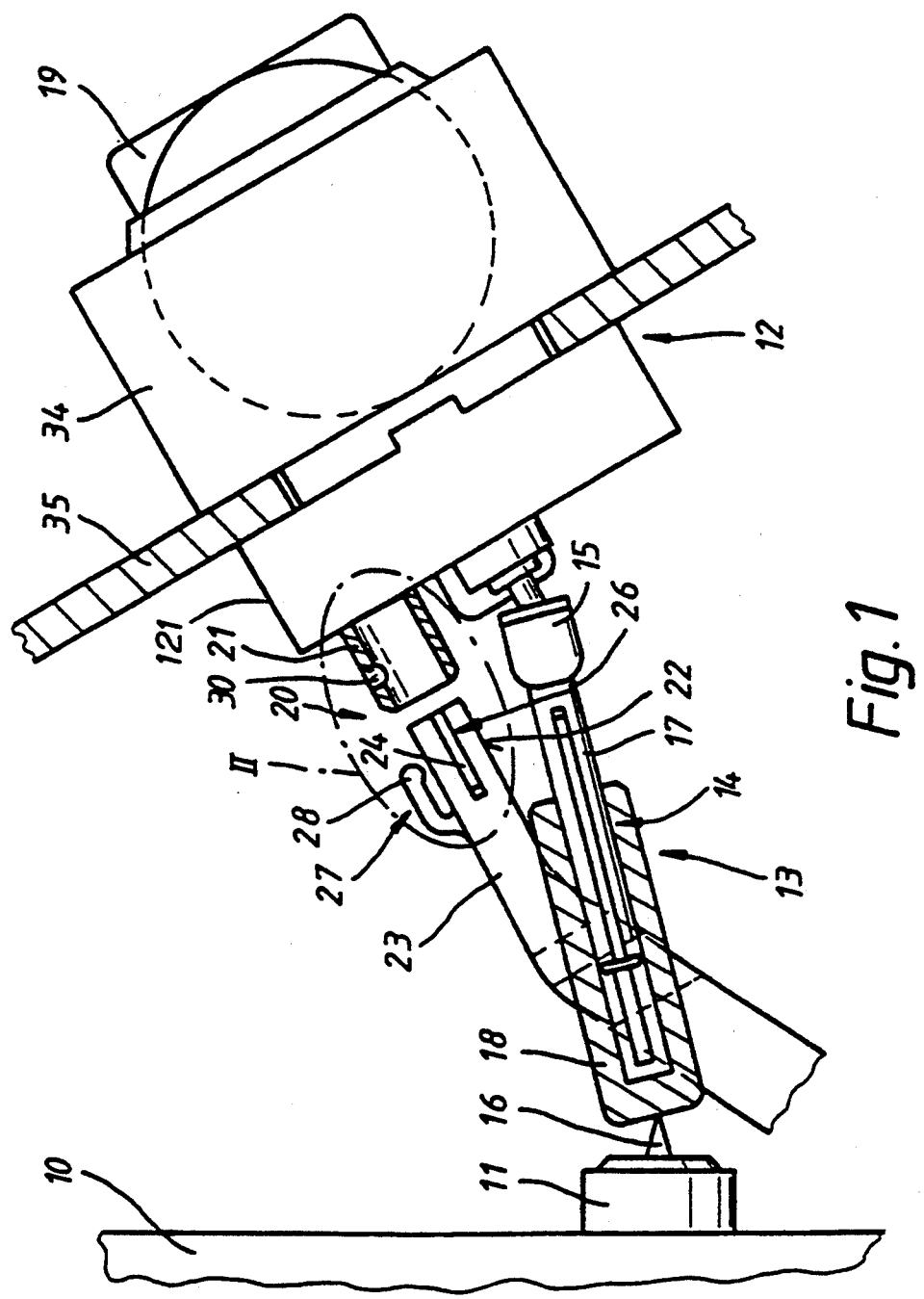
FIG. 1 is a side part sectional schematic view of a portion of a heating system or air conditioning system for motor vehicles after final assembly in a motor vehicle, constructed according to a preferred embodiment of the invention.
Figure 2:
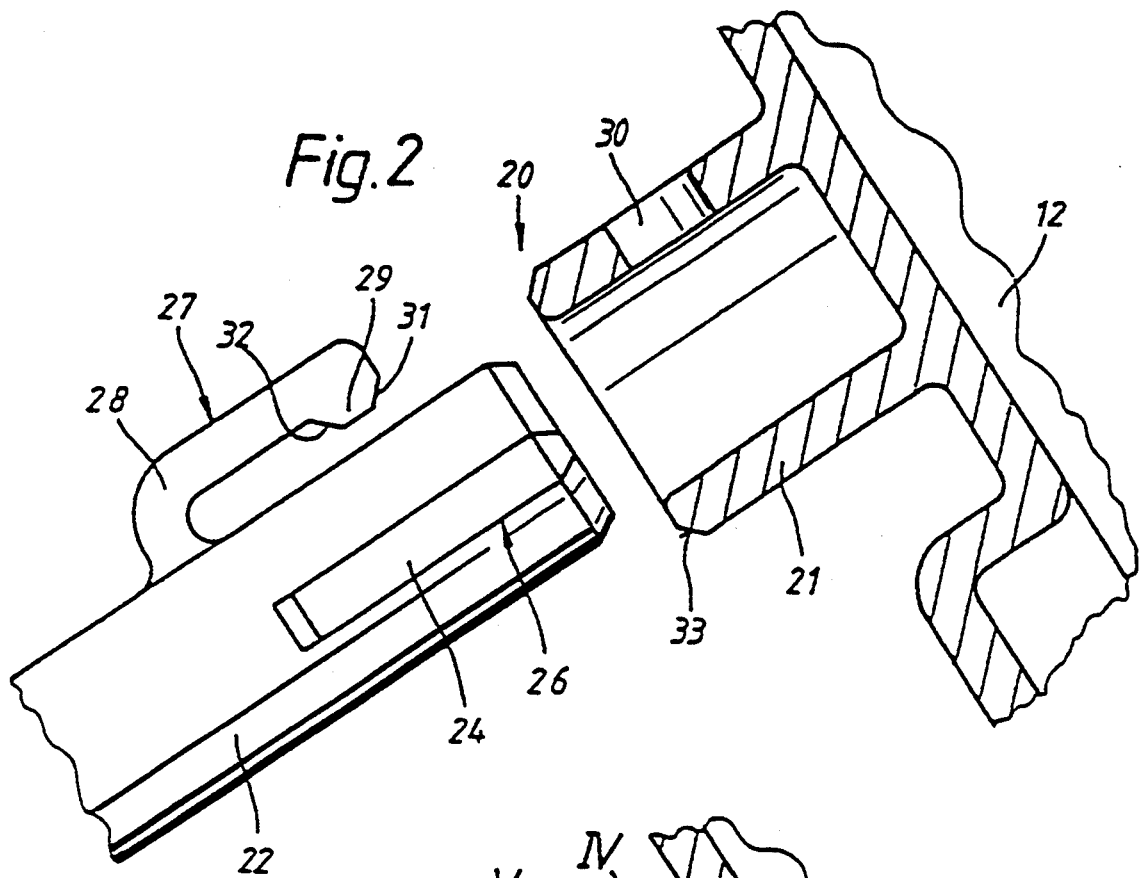
FIG. 2 shows an enlarged representation of the region II in FIG. 1.
Figure 3:
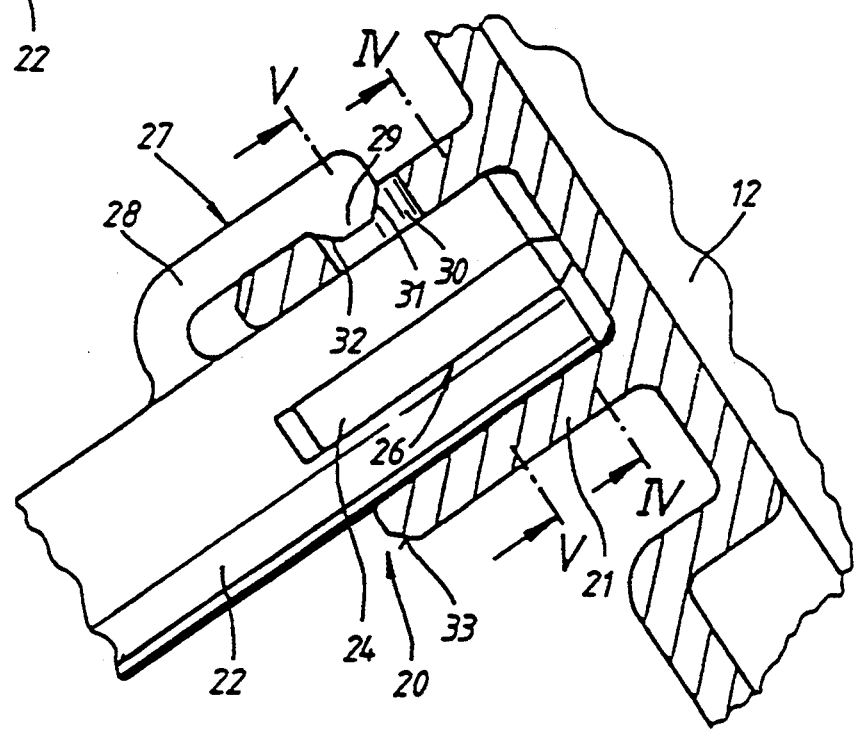
FIG. 3 shows a representation similar to that in FIG. 2 in the pre-assembly stage of the heating system or air conditioning system.

The motor vehicle heating system or air conditioning system shown in side view and as an excerpt in FIG. 1 has a heater box 10 in which the sub-assembly and associated control units (not shown here) for the functioning of the heating system or air conditioning system are accommodated. The air distribution flaps, with which both the magnitude and the direction of the airflow can be adjusted, represent an example of a control unit. The air distribution flaps are connected to an adjustment device, of which an adjustment element 11 emerges from the heater box 10. The actuation of the adjustment device to adjust the air distribution flaps takes place by means of an operator unit 12 fastened to the dashboard or the instrument panel 35 of the motor vehicle. The operator unit 12 is connected to the adjustment element 11 protruding from the heater box 10 by a universal joint arrangement 13. The universal joint arrangement 13 has a link rod 14 of telescopic design with two universal joints 15, 16 at the ends, one of which is fixed to the operator unit 12 and the other to the adjustment element 11. The telescopic rod 17, which can be axially displaced in the telescopic sleeve 18, is guided in the latter so that it cannot rotate. The universal joint arrangement 13 transmits the rotary motion of an operator knob 19 integrated in the operator unit 12 to the lever end 11 so that the air distribution flaps can be correspondingly pivoted and brought into the desired position.

Figure 4:
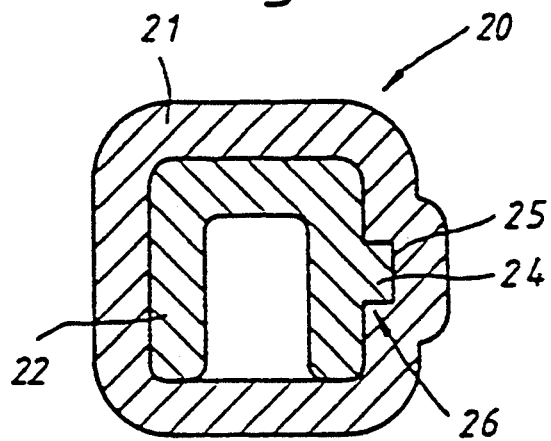
FIG. 4 shows a section along the line IV—IV in FIG. 3.
Figure 5:
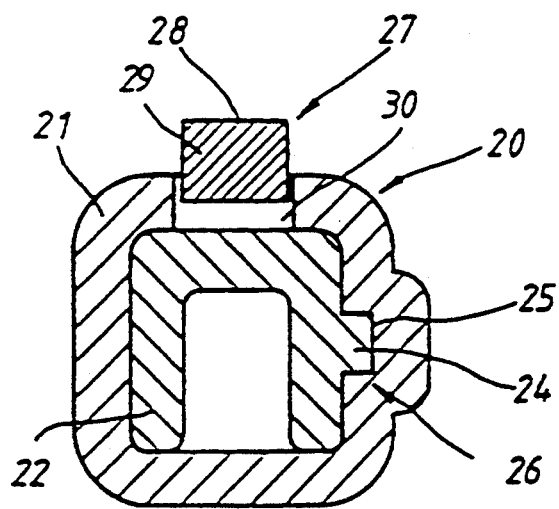
FIG. 5 shows a section along the line V—V in FIG. 3.

The association between the position of the operator knob 19 and the position of the air distribution flaps in the heater box 10 is fixed during pre-assembly before installation of the heating system or air conditioning system in the motor vehicle (adjustment). An assembly aid element 20 then firmly connects the operator unit 12 with the heater box 10 so that the adjustment is not lost up to the point of final assembly of the heating system or air conditioning system in the motor vehicle. For this purpose, the assembly aid element 20 is embodied in two parts as a plug-in connection, one plug-in part being formed integrally on the back of the casing 121 of the operator unit 12 as a plug-in sleeve 21 and the other plug-in part being configured as a plug-in peg 22 which is formed integrally at the free end of a connecting arm 23. As may be seen from FIG. 4 and 5, the plug-in peg 22 has an approximately U-shaped cross-section and the plug-in sleeve 21 has an approximately square cross-section. The plug-in peg 22 is guided with clearance in the plug-in sleeve 21 and carries, in addition, an axial rib 24 protruding transversely from one arm. When the plug-in peg 22 is pushed into the plug-in sleeve 21, the axial rib 24 engages as a form fit in an axial groove 25 provided in the plug-in sleeve 21. By this means, a very closely toleranced rotational lock 26 can be realized in a simple manner between the two plug-in parts formed by the plug-in sleeve 21 and the plug-in peg 22. If the two plug-in parts are configured as bodies of rotation, this rotary lock 26 is essential in order to prevent rotation of the two plug-in parts relative to one another and, therefore, to prevent loss of adjustment of the operator unit 12 and the control unit in the heater box 10.

The plug-in connection provided by the plug-in sleeve 21 and the plug-in peg 22 is secured by a clip-type interlock 27 against unintentional release of the plug-in connection. The interlock 27 consists of a spring tongue 28 with an engagement lug 29 located on the plug-in peg 22 and an engagement hole 30 introduced as a drilled hole in the plug-in sleeve 21. The spring tongue 28 is fixed with the base of the tongue on the plug-in peg 22 and extends towards the free end of the plug-in peg 22 at a distance from the periphery of the latter, this distance being slightly larger than the wall thickness of the plug-in sleeve 21. At the free end of the spring tongue 28, the engagement lug 29 projects towards the plug-in peg 22. In order to facilitate the making and release of the plug-in connection, the engagement lug 29 carries two lift-out bevels 31, 32 diametrically opposite to one another in the displacement direction of the two plug-in parts and the plug-in sleeve 21 is provided with a chamfer 33 at its free end. Because of the lift-out bevel 31 and the chamfer 33, the engagement lug 29 slides easily onto the outer surface of the plug-in sleeve 21, with the spring tongue 28 pushed out, and because of the lift-out bevel 32, the engagement lug 29 can be lifted out of the engagement hole 30 with a relatively small expenditure of force. The interlock 27 (on the two plug-in parts 21, 22 and consisting of the spring tongue 28 with engagement lug 29 and the engagement hole 30) is rotated by 90° relative to the rotational lock 26 (consisting of the axial rib 24 and the axial groove 25), so that the engagement hole 30 is located in the side of the plug-in sleeve 21 which extends transversely relative to the side of the plug-in sleeve 21 carrying the axial groove 25 and the spring tongue 28 is located on the transverse web of the U-shaped plug-in peg 22. The connecting arm 23, with plug-in peg 22, spring tongue 28 and axial rib 24 integrally formed on it, is embodied as a plastic part.

During pre-assembly, the plug-in peg 22 is plugged into the plug-in sleeve 21 after adjustment of the operator unit 12, the engagement lug 29 on the spring tongue 28 automatically snapping into the engagement hole 30 and the two plug-in parts being therefore interlocked with one another. The connecting arm 23 carrying the plug-in peg 22 is now firmly connected to the heater box 10, at a position which is easily accessible after installation of the heater box 10 so that the connecting arm 23 with plug-in peg 22 can, if need be, be removed again from the heater box 10. The heating system or air conditioning system pre-assembled in this way is now installed in the motor vehicle, the operator unit 12 being located near its final installation position but not, as yet, taking it up completely. After assembly of the instrument panel 35, the operator unit 12 is fastened in the latter, for which purpose it is pulled by a displacement distance as far as the back of the instrument panel 35 where it is fastened. The fastening takes place, for example, by means of a threaded ring 34 which is screwed onto a threaded pin protruding through the instrument panel 35 and enclosing the operator knob 19. When the operator unit 12 is pulled onto the back of the instrument panel 35, the plug-in sleeve 21 is withdrawn from the plug-in peg 22 to such an extent that the plug-in peg 22 emerges from the plug-in sleeve 21 and the plug-in connection is released. The lifting of the interlock 27 takes place automatically because the spring tongue 28 is pressed outwards by the tensile force acting on the lift-out bevel 32 and, in consequence, the engagement lug 29 is lifted out of the engagement hole 30. The heating system or air conditioning system is now completely and finally assembled in the motor vehicle. Because of the adjustment during pre-assembly, whose retention is ensured until final assembly by the assembly aid element 20, no adjustment work is necessary on the operator unit 12 during final assembly. The connecting arm 23 with plug-in peg 22 can, if required, be dismantled and supplied again to pre-assembly.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Heating system or air conditioning system for motor vehicles having an air box and an operator unit for at least one control unit, which operator unit has to be arranged separately from the air box in the passenger compartment, the operator unit being connected to the air box by means of a control line leading to the control unit, and having a two-part assembly aid element of which one part is firmly connected to the air box and the other part is firmly connected to the operator unit, the two parts being put together in the pre-assembly condition to hold the operator unit on the air box and being pulled apart after installation of the air box for the purpose of placing the operator unit at the installation location, wherein the two parts of the assembly aid element are formed by two plug-in parts of a plug-in connection which can be plugged one into the other and wherein a clip-type interlock is attached to the plug-in connection, which clip-type interlock is engaged by axial pressure on the plug-in parts and can be released by axial tension on one of the plug-in parts.

2. System according to claim 1, wherein one plug-in part is configured as a plug-in sleeve and the other plug-in part is configured as a plug-in peg which can be plugged into the first plug-in part, wherein the interlock has an engagement hole in one plug-in part and a spring tongue with engagement lug protruding from it in the other plug-in part, and wherein the engagement lug is provided with two lift-out bevels located diametrically opposite to one another in the displacement direction of the plug-in parts, which lift-out bevels permit the engagement lug to be pushed onto the first plug-in part, on the one hand, and permit the engagement lug to be lifted out of the engagement hole on the other.

3. System according to claim 2, wherein the plug-in sleeve is configured on a back of the operator unit, and is integral with a casing of the operator unit, and the plug-in peg is configured at the free end of a connecting arm, and is integral with the free end of the connecting arm, and wherein the connecting arm is releasably connected at a position of the air box which is accessible in the installed condition of the air box in the vehicle.

4. System according to claim 2, wherein the spring tongue is located on the plug-in peg, is fixed by the base of its tongue, extends towards a free end of the plug-in peg at a distance from a periphery of the plug-in peg, this distance being slightly longer than the wall thickness of the plug-in sleeve, and wherein the engagement lug projects from the spring tongue towards the plug-in peg.

5. System according to claim 4, wherein the engagement hole is configured in the plug-in sleeve and the plug-in sleeve is provided with a chamfer at its free end.

6. System according to claim 2, wherein the plug-in depth of the plug-in peg in the plug-in sleeve is smaller than the displacement path, necessary after installation of the air box, of the operator unit to its place at the installation location.

7. System according to claim 1, wherein a rotational lock to prevent rotation of the two plug-in parts relative to one another is provided in the plug-in connection.

8. System according to claim 7, wherein the rotational lock has an axial groove machined into one plug-in part and an axial rib on the other plug-in part which can be pushed as a form fit into the axial groove.

9. System according to claim 8, wherein the axial groove is introduced into the plug-in sleeve rotated by 90° relative to the engagement hole, and wherein the axial rib on the plug-in peg protrudes transverse to the plug-in peg rotated by 90° relative to the spring tongue.

10. System according to claim 7, wherein the rotational lock is realized by a rectangular cross-section of the plug-in sleeve and by a U-shaped configuration of the plug-in peg, which is guided by means of its two arms at least on the inner walls of the plug-in sleeve.

11. System according to claim 1, wherein the control line between the operator unit and the air box is configured as a telescopic link rod with telescopic parts which cannot rotate relative to one another and two universal joints at the ends, of which one universal joint is associated with the air box and the other universal joint is associated with the operator unit.

12. A method of manufacturing a heating and air conditioning system for motor vehicles of the type including an air box containing at least one movable air distribution flap and an operator unit arranged separately from the air box in a vehicle passenger compartment, the operator unit being mechanically connected to the air box and including a control line for controlling the at least one air distribution flap, said method comprising:

preassembling the operator unit and air box to form an assembly with precise adjustment of the relative position of the operating control members of the operator unit and the at least one movable air distribution flap, firmly connecting a two-part assembly aid to the preassembled operator unit and air box assembly to hold them in their preassembled adjusted position, installing the preassembled operator unit and air box assembly in a vehicle, and disconnecting the two-part assembly aid;

wherein the two plug-in parts of a plug-in connection which can be plugged one into the other and wherein a clip-type interlock is attached to the plug-in connection, which clip-type interlock which is engaged by axial pressure on the plug-in parts and can be released by axial tension on one of the plug-in parts.

13. A method according to claim 12, wherein one plug-in part is configured as a plug-in sleeve and the other plug-in part is configured as a plug-in peg which can be plugged into the first plug-in part, wherein the interlock has an engagement hole in one plug-in part and a spring tongue with engagement lug protruding from it in the other plug-in part, and wherein the engagement lug is provided with two lift-out bevels located diametrically opposite to one another in the displacement direction of the plug-in parts, which lift-out bevels permit the engagement lug to be pushed onto the first plug-in part, on the one hand, and permit the engagement lug to be lifted out of the engagement hole on the other.

14. A method according to claim 13, wherein the plug-in sleeve is configured on the back of the operator unit, preferably integrally with the casing of the latter, and the plug-in peg is configured at the free end of a connecting arm, preferably integrally with the latter, and wherein the connecting arm is releasably connected at a position of the heater box which is accessible in the installed condition of the heater box in the vehicle.

15. A method according to claim 12, wherein the control line between the operator unit and the heater box is configured as a telescopic link rod with telescopic parts which cannot rotate relative to one another and two universal joints at the ends, of which one universal joint is associated with the heater box and the other universal joint is associated with the operator unit.

16. A system according to claim 1, wherein the air box is a heater box.

* * * * *